US012125628B2

(12) United States Patent
Rippel et al.

(10) Patent No.: US 12,125,628 B2
(45) **Date of Patent: *Oct. 22, 2024**

(54) FLUID COOLED MAGNETIC ELEMENT

(71) Applicant: ENURE, INC., Los Angeles, CA (US)

(72) Inventors: Eric E. Rippel, Los Angeles, CA (US); Wally E. Rippel, Altadena, CA (US)

(73) Assignee: ENURE, INC., Los Angeles, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/932,644

(22) Filed: Jul. 17, 2020

(65) Prior Publication Data

US 2020/0350114 A1 Nov. 5, 2020

Related U.S. Application Data

(63) Continuation of application No. 16/697,137, filed on Nov. 26, 2019, now abandoned.

(60) Provisional application No. 62/772,970, filed on Nov. 29, 2018.

(51) Int. Cl.
*H01F 27/28* (2006.01)

(52) U.S. Cl.
CPC ................................ *H01F 27/2876* (2013.01)

(58) Field of Classification Search
CPC .... H01F 27/2876; H01F 27/29; H01F 27/306; H01F 27/12
See application file for complete search history.

(56) References Cited

U.S. PATENT DOCUMENTS

| | | | |
|---|---|---|---|
| 2,865,086 | A | 12/1958 | Whipple |
| 2,987,684 | A | 6/1961 | Doucette, Jr. |
| 3,028,566 | A | 4/1962 | Camilli |
| 4,000,482 | A | 12/1976 | Staub et al. |
| 4,000,842 | A | 1/1977 | Burns |
| 4,173,746 | A | 11/1979 | Stubblefield et al. |
| 4,679,020 | A | 7/1987 | Kawamura et al. |
| 4,763,072 | A | 8/1988 | Katoh et al. |
| 4,779,070 | A | 10/1988 | Hackworth et al. |
| 4,847,583 | A | 7/1989 | Bernard |
| 5,073,734 | A | 12/1991 | Combette |
| 5,130,687 | A | 7/1992 | Evrard et al. |
| 5,334,899 | A | 8/1994 | Skybyk |
| 5,710,466 | A | 1/1998 | Allen et al. |
| RE36,787 | E | 7/2000 | Hansen et al. |
| 6,211,595 | B1 | 4/2001 | Nose |
| 6,273,022 | B1 | 8/2001 | Pu et al. |

(Continued)

FOREIGN PATENT DOCUMENTS

| | | | |
|---|---|---|---|
| CN | 101473389 | A | 7/2009 |
| CN | 102265358 | A | 11/2011 |

(Continued)

OTHER PUBLICATIONS

International Search Report and Written Opinion of the International Searching Authority, dated Feb. 7, 2020, corresponding to PCT/US2019/63470, 7 pages.

(Continued)

*Primary Examiner* — Tuyen T Nguyen
(74) *Attorney, Agent, or Firm* — Lewis Roca Rothgerber Christie LLP

(57) ABSTRACT

A fluid-cooled magnetic element. Coils are formed with small gaps between the turns of the coils. Coolant flow through the gaps cools the coils.

17 Claims, 17 Drawing Sheets

(56) References Cited

U.S. PATENT DOCUMENTS

| | | | |
|---|---|---|---|
| 6,300,857 B1 | 10/2001 | Herwig | |
| 6,720,688 B1 | 4/2004 | Schiller | |
| 6,879,237 B1 | 4/2005 | Viarouge et al. | |
| 7,710,228 B2 | 5/2010 | Feng et al. | |
| 9,496,085 B2 | 11/2016 | Pal et al. | |
| 9,911,525 B2 | 3/2018 | Stelzer et al. | |
| 10,060,682 B2 | 8/2018 | Rippel et al. | |
| 11,387,030 B2 | 7/2022 | Rippel et al. | |
| 11,508,509 B2 | 11/2022 | Rippel et al. | |
| 2001/0054383 A1 | 12/2001 | Pu et al. | |
| 2003/0102764 A1 | 6/2003 | Kusase | |
| 2004/0182517 A1 | 9/2004 | Lai et al. | |
| 2006/0044104 A1 | 3/2006 | Derks | |
| 2007/0090916 A1* | 4/2007 | Rao | H01F 17/062 336/229 |
| 2009/0140829 A1 | 6/2009 | Sodo | |
| 2009/0261933 A1 | 10/2009 | Kiuchi et al. | |
| 2010/0007225 A1 | 1/2010 | Platon et al. | |
| 2011/0205007 A1 | 8/2011 | Kiuchi et al. | |
| 2011/0221287 A1 | 9/2011 | Lucchi | |
| 2011/0273256 A1 | 11/2011 | Johnson et al. | |
| 2012/0153718 A1 | 6/2012 | Rawlinson et al. | |
| 2013/0099887 A1 | 4/2013 | Yamamoto | |
| 2013/0257574 A1 | 10/2013 | Downing et al. | |
| 2013/0278369 A1 | 10/2013 | Shepard et al. | |
| 2014/0132378 A1* | 5/2014 | Vafakhah | B60K 6/44 903/902 |
| 2014/0159846 A1 | 6/2014 | Krämer et al. | |
| 2014/0292456 A1 | 10/2014 | Suzuki et al. | |
| 2015/0042437 A1 | 2/2015 | White | |
| 2015/0097644 A1 | 4/2015 | Shepard et al. | |
| 2015/0213944 A1 | 7/2015 | Kuroda et al. | |
| 2015/0221430 A1 | 8/2015 | Wu Li | |
| 2015/0228399 A1 | 8/2015 | Yoshimori et al. | |
| 2016/0005521 A1 | 1/2016 | Pal | |
| 2016/0005524 A1 | 1/2016 | Downing | |
| 2016/0181000 A1 | 6/2016 | Yen et al. | |
| 2016/0189857 A1 | 6/2016 | Imanishi et al. | |
| 2016/0226327 A1 | 8/2016 | Rippel et al. | |
| 2017/0110238 A1 | 4/2017 | Daily et al. | |
| 2017/0330670 A1 | 11/2017 | Rippel et al. | |
| 2018/0157279 A1 | 6/2018 | Ganowsky et al. | |
| 2020/0082968 A1 | 3/2020 | Rippel et al. | |
| 2020/0176174 A1 | 6/2020 | Rippel et al. | |

FOREIGN PATENT DOCUMENTS

| | | |
|---|---|---|
| CN | 103578715 A | 2/2014 |
| CN | 104603893 A | 5/2015 |
| CN | 105103409 A | 11/2015 |
| CN | 106662408 A | 5/2017 |
| CN | 109155180 A | 1/2019 |
| JP | 59-46015 A | 3/1984 |
| JP | 60-33082 A | 2/1985 |
| JP | 6-251956 A | 9/1994 |
| JP | 2004-55802 A | 2/2004 |
| JP | 2016-127121 A | 7/2016 |
| KR | 10-2013-0111922 A | 10/2013 |

OTHER PUBLICATIONS

International Preliminary Report on Patentability for International Application No. PCT/US2019/063470, dated Feb. 3, 2021, 37 pages.
U.S. Office Action from U.S. Appl. No. 16/697,137, dated Sep. 24, 2021, 5 pages.
Korean Office Action, for Patent Application No. KR 10-2021-7019840, dated Apr. 1, 2023, 5 pages.
Partial English translation of the Korean Office Action, for Patent Application No. KR 10-2021-7019840, dated Apr. 1, 2023, 3 pages.
Chinese Notification of the First Office Action, for Patent Application No. 201880043770.0, mailed May 7, 2022, 7 pages.
Chinese Notification of the First Office Action, for Patent Application No. 201780029677.X, dated Jan. 3, 2020, 8 pages.
Chinese Notification of the Second Office Action, for Patent Application No. 201780029677.X, dated Oct. 29, 2020, 3 pages.
Chinese Notification of the Third Office Action, for Patent Application No. 201780029677.X, dated Jul. 28, 2021, 13 pages.
German Notification of Office Action, for Patent Application No. DE112017002471.4, dated Jun. 9, 2023, 13 pages.
International Search Report and Written Opinion of the International Searching Authority, Mailed Sep. 13, 2018, Corresponding to PCT/US2018/040059, 10 pages.
International Search Report and Written Opinion of the International Searching Authority, Mailed Jul. 18, 2017, Corresponding to PCT/US2017/032559, 11 pages.
Japanese Notification of Reasons for Rejection, for Patent Application No. JP 2018- 559702, mailed Oct. 29, 2019, 6 pages.
Partial English translation of the Chinese Notification of the First Office Action, for Patent Application No. 201780029677.X, dated Jan. 3, 2020, 11 pages.
Partial English translation of the Chinese Notification of the First Office Action, for Patent Application No. 201880043770.0, mailed May 7, 2022, 11 pages.
Partial English translation of the Chinese Notification of the Second Office Action, for Patent Application No. 201780029677.X, dated Oct. 29, 2020, 6 pages.
Partial English translation of the Chinese Notification of the Third Office Action, for Patent Application No. 201780029677.X, dated Jul. 28, 2021, 22 pages.
Partial English translation of the Japanese Notification of Reasons for Rejection, for Patent Application No. JP 2018-559702, mailed Oct. 29, 2019, 13 pages.
U.S. Office Action from U.S. Appl. No. 15/594,521, dated Mar. 5, 2019, 15 pages.
U.S. Office Action from U.S. Appl. No. 16/022,463, dated Mar. 11, 2021, 68 pages.
U.S. Office Action from U.S. Appl. No. 16/194,235, dated Feb. 22, 2021, 16 pages.
U.S. Office Action from U.S. Appl. No. 16/194,235, dated Sep. 20, 2021, 17 pages.
U.S. Office Action from U.S. Appl. No. 16/685,845 dated Apr. 21, 2022, 7 pages.
U.S. Notice of Allowance with accompanying list of references cited by examiner dated Nov. 8, 2019, for U.S. Appl. No. 15/594,521, 14 pages.
Chinese Notification of the First Office Action, for Patent Application No. 201980089871.6, mailed May 31, 2024, 9 pages.
Partial English translation of the Chinese Notification of the First Office Action, for Patent Application No. 201980089871.6, mailed May 31, 2024, 12 pages.

* cited by examiner

FLUID COOLED MAGNETIC ELEMENT

CROSS-REFERENCE TO RELATED APPLICATION(S)

The present application is a continuation of U.S. patent application Ser. No. 16/697,137, filed Nov. 26, 2019, entitled "FLUID COOLED MAGNETIC ELEMENT", which claims priority to and the benefit of U.S. Provisional Application No. 62/772,970, filed Nov. 29, 2018, entitled "FLUID COOLED MAGNETIC ELEMENT", the entire contents of all documents identified in this paragraph are hereby incorporated herein by reference as if fully set forth herein.

FIELD

One or more aspects of embodiments according to the present disclosure relate to magnetic elements, and more particularly to fluid cooled magnetic elements.

BACKGROUND

Magnetic elements such as transformers and inductors serve important functions in various power processing systems. In order to minimize their size and cost, current densities and electrical frequencies may be made as high as possible. However since conductor heat generation is proportionate to the square of current density, and core heat generation is approximately proportionate to the square of the frequency, it follows that efficient heat transfer is important. The end result is that power density for magnetic elements is in effect limited by heat transfer. In such a system, it may be advantageous to arrange for efficient heat transfer from the winding and core and also for low eddy losses—both within the winding and the core.

Thus, there is a need for magnetic elements having designs which achieve improved heat transfer efficiencies.

SUMMARY

Aspects of embodiments of the present disclosure are directed toward a non-toroidal magnetic element.

A magnetic element is identified which consists of one or more helically wound coils, aligned and placed over a common ferro-magnetic core. Each coil may be formed from a conductor having a rectangular section. An annular gap or "inner radial gap" between the I.D. of each coil and the core provides a first ("axial") coolant flow path. Spaces or gaps ("axial gaps") between adjacent turns of each coil establish a second (or "radial") flow path which may receive fluid flow from the first flow path. The first flow path may provide core cooling, while the second flow path provides winding cooling. Coolant flow may be introduced into the first flow path by a feed element duct, shroud, or a combination of both. A terminal assembly is added which serves to electrically terminate the start and finish of each coil and provide electrical connection to terminal posts. The entire assembly may be included within a liquid-tight housing which includes an inlet port which introduces coolant and an outlet port which collects coolant.

In some embodiments the conductor is edge wound (i.e., bent on an axis parallel to the smaller dimension of the conductor cross section); in other cases, the conductor may be face wound, where bending is along an axis parallel to the larger conductor dimension. In some embodiments, the coil conductor may be structured from multiple layers. This may simplify the winding process while reducing high frequency eddy losses. Coils can be connected is series or parallel combinations to achieve desired electrical and heat transfer parameters. By using two or more coils connected in parallel in place of a single coil, coolant contact area may be increased such that overall heat transfer is improved. For a given coolant head loss, there exists an optimal turn-to-turn gap which results in minimized thermal impedance. For gaps larger than this critical value, thermal impedance is increased due to increased heat flow distance within the coolant. For gaps smaller than the critical value, thermal impedance is increased due to reduced coolant flow. For the vast majority of applications, the value of this optimal gap is between 0.001" and 0.070" (between 0.001 inches and 0.070 inches).

In most cases, it is required that the coils be electrically insulated from the core. Various approaches may be utilized to achieve sufficient breakdown voltages between the coils and core. Where voltages are relatively low, this may be accomplished by powder coating the core and/or winding surface. Where voltages are relatively high, an electrically insulating bobbin may be included within the gap between the core and respective coils. In some designs, a radial gap (the "inner radial gap") between the coil and the core may be achieved such that the core is effectively "floating" within the inner I.D. region of the coil. This gap may be used to both facilitate fluid flow as well as acting as a dielectric barrier between the coil and the core. Where multiple coils are involved, adjacent coils may be separated by an insulating spacer such that adequate voltage withstand between adjacent coils is provided and/or adequately low coil to coil capacitance is achieved.

Some embodiments may be used to construct inductors and transformers of various types. In the case of transformers, coils may be interleaved such that desired levels of leakage inductance between windings can be achieved. Polyphase transformers and polyphase inductors can be structured using appropriate ferro-cores. Because of the extremely efficient heat transfer between individual coils and the coolant, very high current densities can be handled without incurring excessive temperature rise; for some designs, current densities in excess of 5000 A/cm$^2$ can be accommodated. In the case of high frequency transformers and inductors, such high current densities enable extremely high power densities—in some cases in excess of 100 kW/kg.

Cores molded from powdered-iron and ferrite materials are typical choices for the new magnetic element. Features can be molded within the surface of such cores to aid coolant flow, increase heat transfer between the core and the working fluid, and/or to insure that the gap between the core surface and the coil inner surface is uniform.

In one embodiment, the terminal assembly performs the function of a circuit board such that individual coils are appropriately interconnected with each other and with terminal posts which protrude through the enclosure to provide the required electrical ports for external connection of cables and wires. Alternative means of terminating the respective coils can also be used.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a fluid cooled magnetic element provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
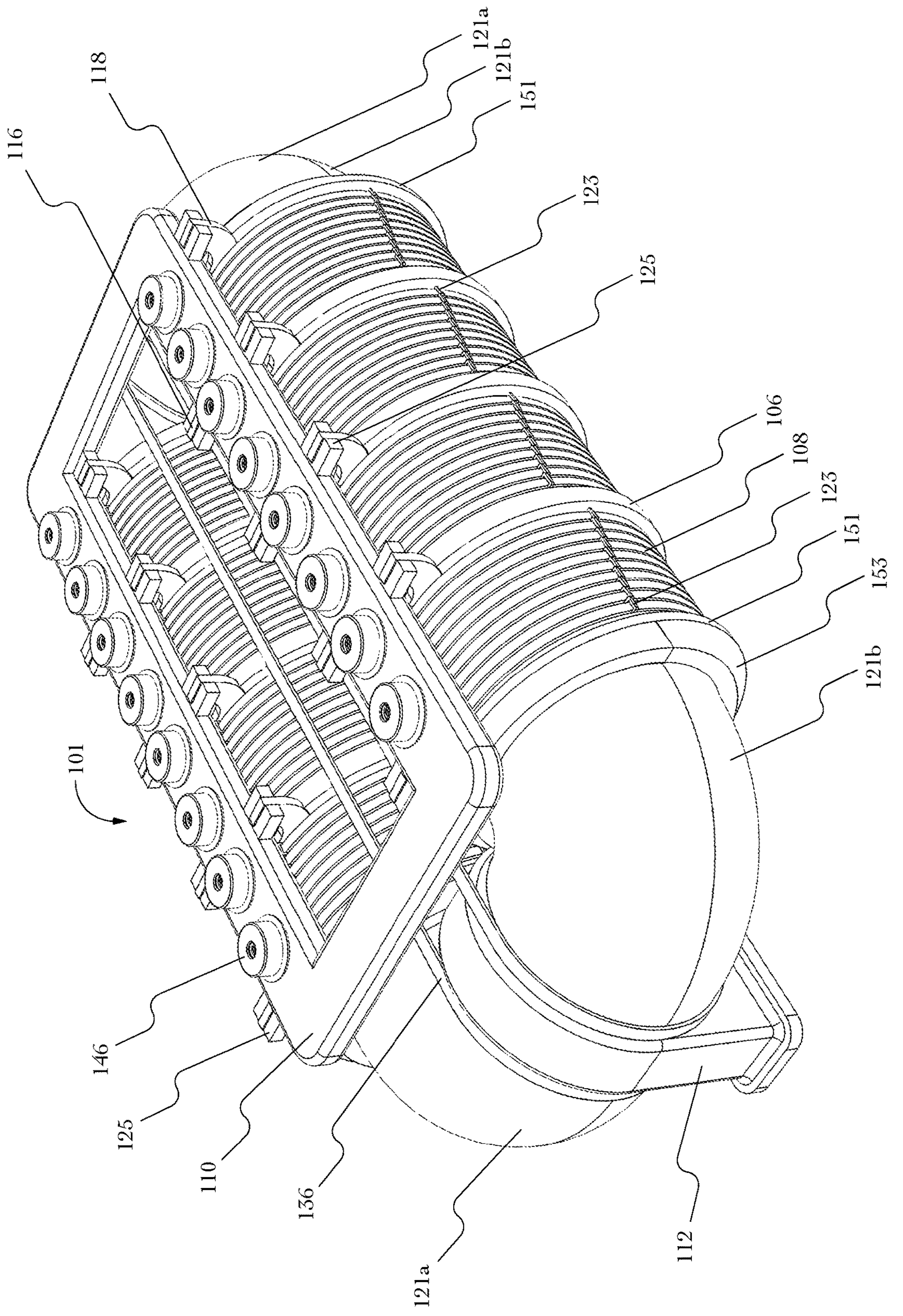
FIG. 1*a* is a perspective view of a magnetic assembly using a U-U ferro-core, according to an embodiment of the present invention.

FIG. 1*a* is a perspective view of a magnetic assembly 101 using a U-U ferro-core 130 (FIG. 1*b*), according to an embodiment of the present invention. Helically-wound coils 108 are placed over ferro-core 130 such that an annular gap or "inner radial gap" 115 (visible in FIG. 9) exists between the I.D. of each coil 108 and the surface of core 130. This gap is "radial" in the sense that it extends between two parts that are separated (by the gap) in the radial direction. Coolant applied via inlet duct(s) 112 is subsequently directed via shrouds 121*a* and 121*b* to flow in the inner radial gap 115 between ferro-core 130 and coils 108. Coolant exits by flowing radially outward through gaps, or "axial gaps" 127 between adjacent turns of each coil 108 (or between coils and spacers 106 (discussed in further detail below)); in turn, axial gaps 127 are established by turn spacers 123. The axial gaps 127 are "axial" in the sense that each of them extends between two parts (e.g., between two turns of a coil, or between a turn of a coil and a spacer 106) that are separated (by the gap) in the axial direction. The shrouds 121*a* and 121*b* prevent coolant from flowing directly from the interior volume of the coils to the exterior of the coils without flowing through the axial gaps 127, and the shrouds 121*a* and 121*b* also cause coolant to flow over the surface of the ends of the core, thereby cooling the ends of the core. In some embodiments, a suitable seal (or partial seal) may be used (instead of a shroud) at the end of a coil stack to prevent (or impede) fluid from escaping from the inner radial gap 115 except through the axial gaps 127. In some embodiments a certain amount of bypass flow through such a partial seal may be provided, for example to cool the ends of the core. As used herein, a "coil" is a conductor consisting of one or more turns.

Figure 1B:
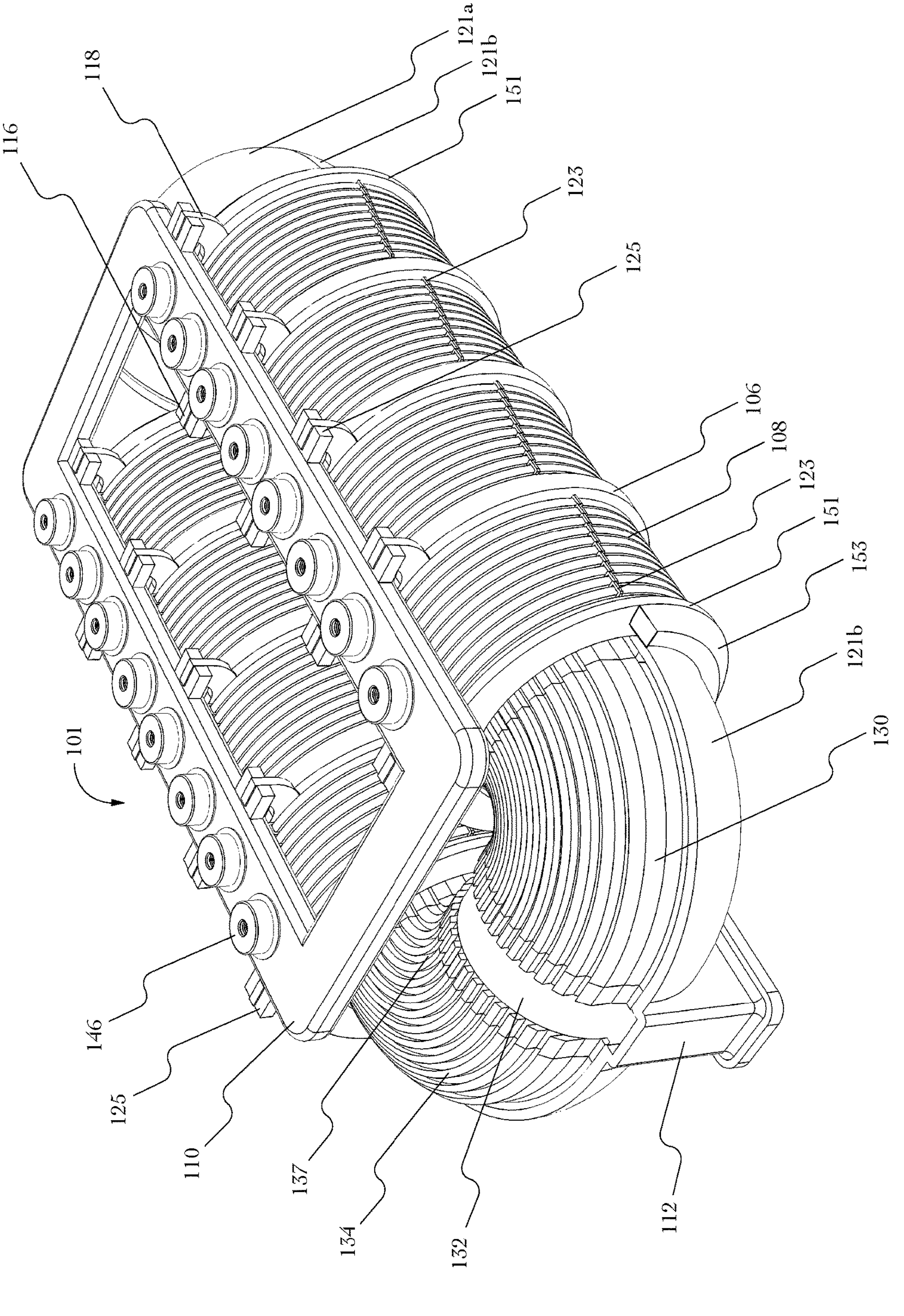
FIG. 1*b* is a partially disassembled perspective view of a magnetic assembly using a U-U ferro-core, according to an embodiment of the present invention.
Figure 1C:
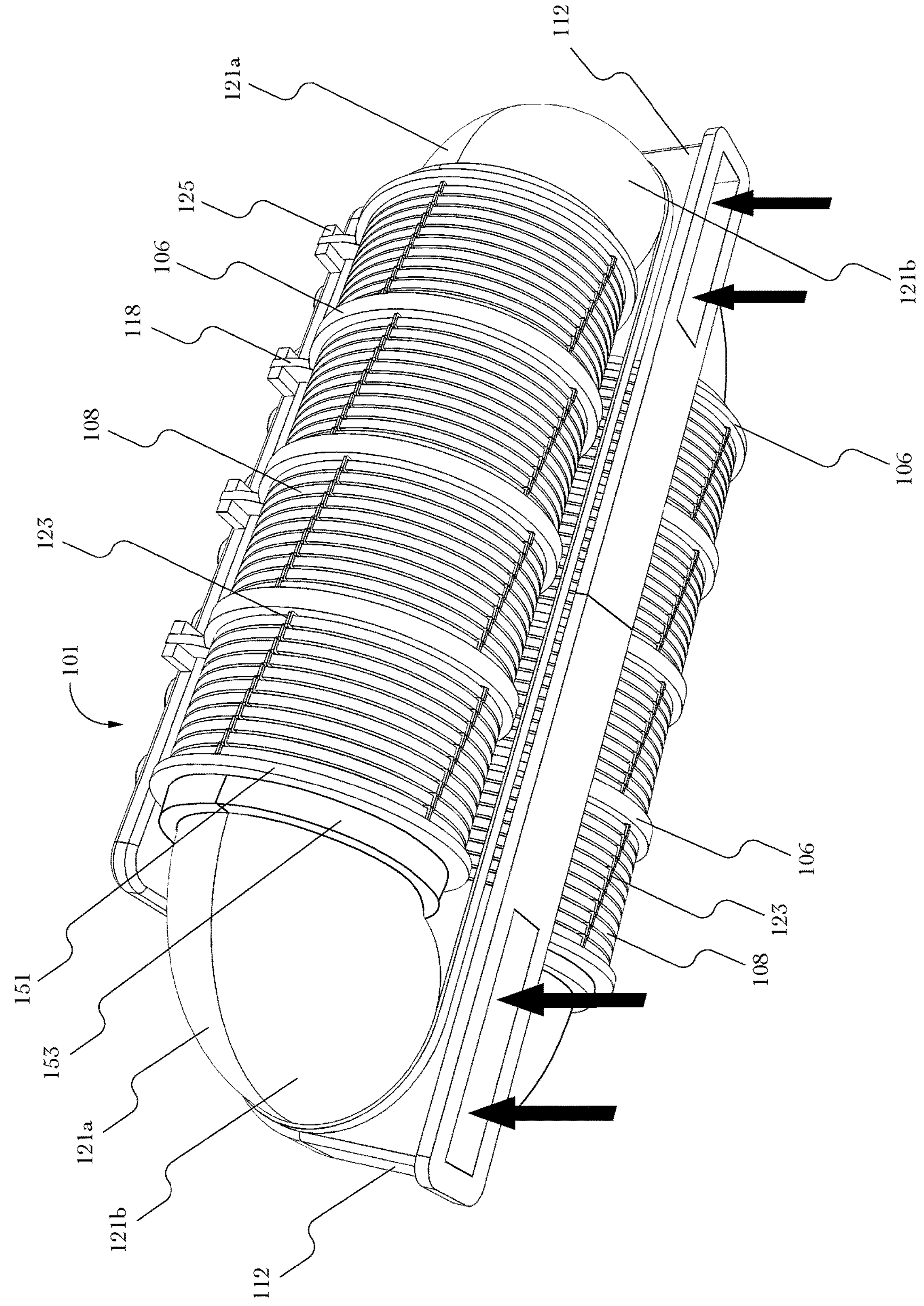
FIG. 1*c* is a perspective view of a magnetic assembly using a U-U ferro-core, according to an embodiment of the present invention.

In some embodiments, coolant is fed into the inner radial gap 115 through a different path from that shown in FIG. 1*c* (in which it flows through two inlet ducts 112). For example, it may flow through one or more inlet ducts 112 of the kind shown in FIG. 7, and at one or both ends, the shrouds 121*a*, 121*b* may be connected together without an intervening inlet duct 112, or the end of each coil stack may be sealed or partially sealed (e.g., allowing some fluid to bypass the partial seal), e.g., using an end shoulder 151. As used herein, a "coil stack" is a stack consisting of one or more coils, zero or more spacers 106, and zero or more end shoulders 151.

By maintaining small values (i.e., widths) of axial gaps 127, efficient heat transfer from coils 108 to coolant can be achieved—which enables coils 108 to handle high current densities—e.g., greater than 50 A/mm$^2$. This in turn enables very high specific power levels to be handled—for example, greater than 300 kW/kg for transformers operating at 20 kHz. As flow gaps 127 are reduced, heat transfer from coils 108 to coolant is improved at the expense of increased head loss. As such, there exists an optimal gap size which minimizes the overall thermal impedance—for a given head loss and coolant viscosity. In some embodiments the inner radial gap 115 has a gap width of 0.050". In some embodiments the axial gap 127 has a gap width of 0.004", or between 0.001" and 0.070", as discussed in further detail below. Spacers may be fabricated as injection molded thermo-plastic strips, injection molded thermo-sets strips, or other planar materials such as Nomex™ paper. Alternatively, axial gap 127 may be established by "interlacing" or "interweaving" a thread of the appropriate thickness and width between adjacent axial gaps of coil turns (as shown in FIG. 1*a*), or otherwise securing a thread to the coil such that portions of the thread are in the axial gaps 127, setting the widths of the axial gaps 127. The width of the flow gap may affect the performance of the magnetic element. As the axial gap 127 (g) (i.e., the width of the flow gap) is reduced, the characteristic heat flow length within the coolant is reduced—which serves to reduce the thermal conductivity component of thermal impedance. Conversely, as g is increased, the coolant flow rate increases—which serves to decrease the thermal mass component of thermal impedance. Because of these opposing effects, it follows that there exists an optimum value for the flow gap (under conditions of constant head loss) which results in a minimum for the overall thermal impedance. Based on first principles, this optimal gap ($g_{opt}$) is found as $$g_{opt}=3.46[(\mu K\Delta R^2)/(c_p\rho P)]^{0.25},$$

where μ is the coolant dynamic viscosity, K is the coolant thermal conductivity, $c_p$ is the coolant specific heat, ρ is the coolant mass density, P is the coolant head loss caused by the gap, and ΔR is the radial build of the coil. The corresponding heat transfer ($h_c$) coefficient (e.g. $W/m^2/C$) is found as $$h_c=0.865[(c_p\rho PK^3)/(\mu\Delta R^2)]^{0.25}$$

In one embodiment, where transformer oil is the coolant, the radial build is 1 cm (0.010 m), and the head loss is 1 psi (6895 Pa), the above equations may be used to find the optimal gap and the corresponding heat transfer coefficient. (For transformer oil at 60 C, μ=0.01 Pa-sec, K=0.2 W/m/C, $c_p$=1800 J/kg/C, and ρ=880 $kg/m^3$.) The optimal gap is found as 0.065 mm or 0.00261 inch. The corresponding heat transfer coefficient is found as 2644 $W/m^2/C$.

From the first equation, it is noted that the optimal gap grows as the square root of the radial build (i.e., the radial extent of the conductor). Increasing ΔR by a factor of ten causes the gap to grow by about a factor of three. Noting further that all of the other factors are taken to the one fourth power, it follows that the gap changes slowly with respect to any of these.

In the case where high values of P and small values of ΔR are used, optimal gap values could be on the order of 0.001 inch. However, fabrication, tolerance and stability considerations will typically call for increased gap values. Accordingly, in some embodiments the gap width set at about 0.001 inch. Likewise, for large coils, where the radial build is on the order of 0.1 m, a relatively viscous coolant is used (e.g. μ=0.1 Pa-sec), and head loss is small (e.g., 0.25 psi or 1750 Pa), the optimal gap calculates as 1.8 mm=0.071 inch. (The corresponding heat transfer coefficient is 332 $W/m^2/C$.) Accordingly, in some embodiments the gap may be as large as 0.07 inches.

In some embodiments, a gap differing from the optimal gap by as much as a factor of three (i.e., a gap in the range of 0.33 $g_{opt}$-3.00 $g_{opt}$) may be used, without an unacceptable degradation of performance. In some embodiments, Class H materials, which may be rated for 180 degrees C., may be used, and the temperature difference between the inlet and the outlet may be as much 100 degrees C. In some embodiments a design such as that of FIG. 1 may have an overall length of about 10 inches and be capable of withstanding about 5 kW (e.g., at least 1 kW) of dissipated power (which may correspond to about 1 MW of through power). A pressure difference of 1 psi (e.g., in the range from 0.2 psi to 5.0 psi) may be provide sufficient fluid flow in such an embodiment.

The coolant may be any fluid suitable for cooling, and the terms "fluid" and "coolant" are used interchangeably herein. The assembly may be cooled with a suitable fluid, which may be a liquid such as transformer oil, automatic transmission fluid or ethylene glycol, or which may be a gas, such as air. It will be understood that although some embodiments described herein are described for convenience with fluid flowing in a particular direction, e.g., from a fluid inlet, radially outward through flow gaps, and through a fluid outlet, in some embodiments the fluid flows in the opposite direction to similar or identical effect. Although some embodiments are described as including a ferromagnetic core, in some embodiments (corresponding to magnetic elements which may be referred to as "air-core" magnetic elements) such a ferromagnetic core may be absent, and, for example, the interior volume of any coil may be filled with cooling fluid.

Figure 6A:
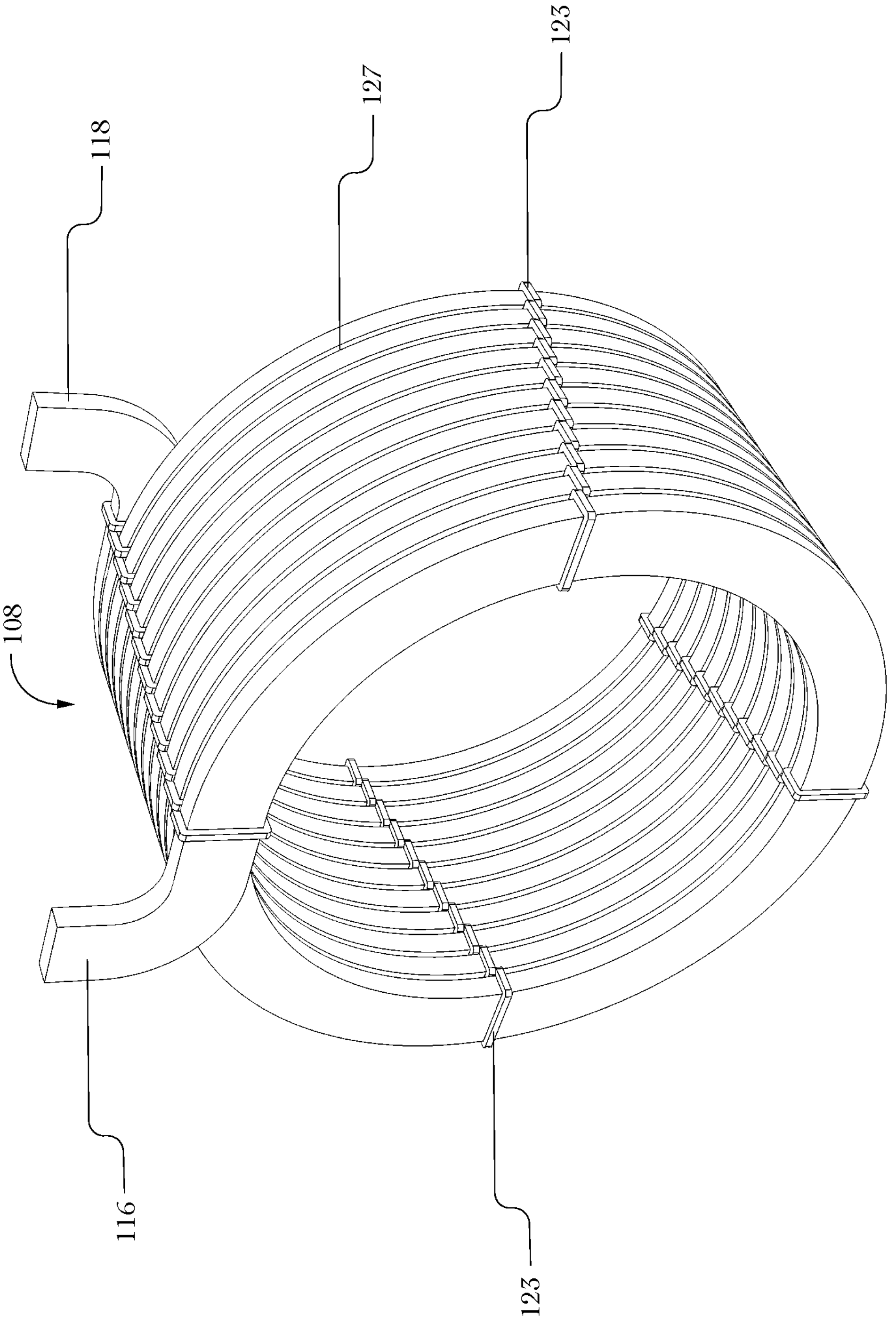
FIG. 6*a* is a perspective view of a single conductor coil used in the magnetic assembly according to an embodiment of the present invention.
Figure 8:
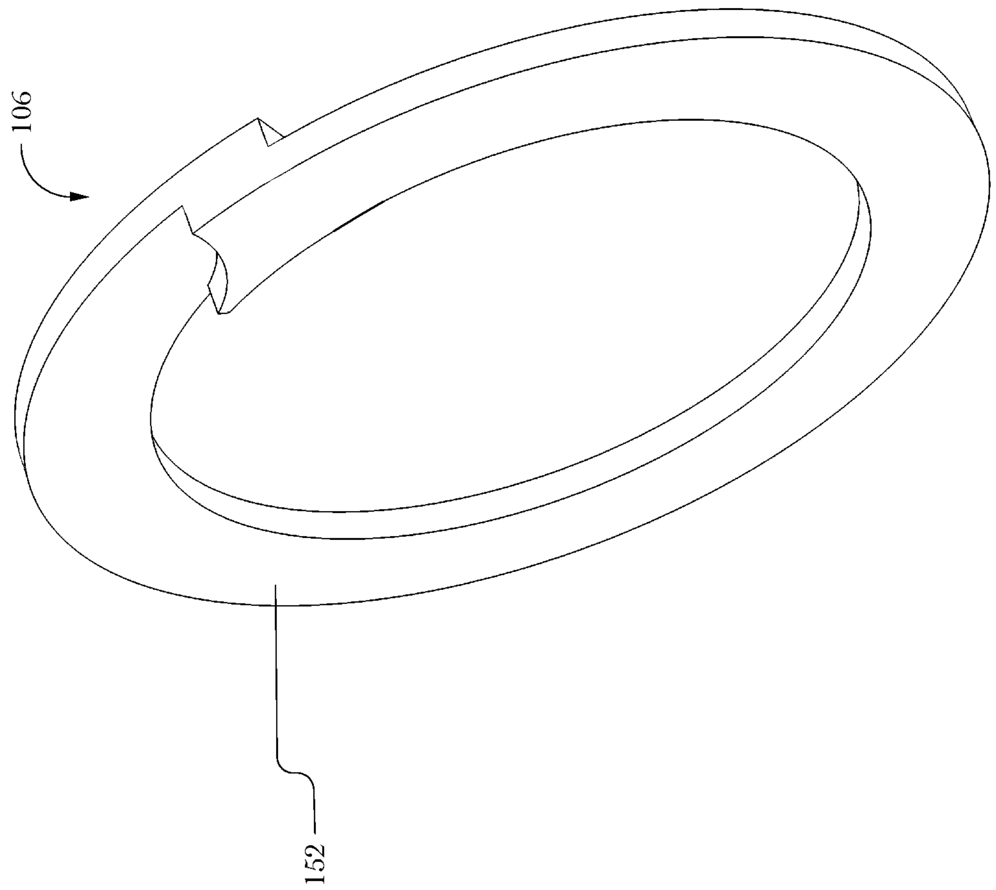
FIG. 8 is a perspective view of a spacer which may be used to separate adjacent coils of the magnetic assembly according to an embodiment of the present invention.

Details of coil 108 are shown in FIG. 6*a*. Spacers 106 may be placed between adjacent coils 108 to provide required electrical insulation and mechanical compliance. As shown in FIG. 8, the surface of spacer 106 is structured to conform to the end surfaces of abutting helical coils 108 such that a controlled gap is established to allow radial coolant flow between the spacer and coil. Individual coils 108 are terminated via terminal assembly 110 where coil starts 116 and coil finishes 118 connect to terminal tigs 125 which in turn connect with respective terminal posts 146. The assembly consisting of inlet duct(s) 112, shrouds 121*a* and 121*b*, coils 108, and spacers 106 is held in compression by tension bands 136. As used herein, a "turn spacer" is any feature that is used to establish a desired fluid gap between adjacent turns. This may include the use of a single thread such as a fiber which is interposed between adjacent turns; it may also include the use of individual spacing elements placed between adjacent turns.

FIG. 1B is a partially disassembled perspective view of magnetic assembly 101 using a U-U ferro-core, according to an embodiment of the present invention. Details of core 130 are apparent in this view—including flow groove 132 and core fins 134. Flow groove 132 serves to distribute coolant flow received from inlet duct(s) 112 to flow over the surface of core 130. Coolant flow is constrained at both ends of magnetic assembly 101 via shrouds 121*a* and 121*b*. Core fins 134, separated by channels 137, may be included on the core surface to aid in heat transfer between core 130 and the coolant. In some embodiments, core fins 134 are absent. End shoulders 151 serve to axially constrain coils 108, spacers 106 and feed plate 112 such that the combination forms a rigid assembly. As with spacers 106, end shoulders 151 are structured to conform to the end surfaces of abutting helical coils 108 such that a controlled gap is established to allow radial coolant flow between the spacer and coil. In the case of FIG. 5, end shoulders 151 may include additional features which terminate gap 115 (not shown), such that unwanted coolant flow is prevented, thus forcing fluid flow to exit via axial gaps 127. Axial prongs 154 (shown in FIG. 4) may be included which serve to function as a bobbin which aids in maintaining axial gap 115 between coils 108 and core 130. In some embodiments, axial prongs 154, or other like features, may be included on one or both ends of spacers 106 (not shown in FIGS. 1 through 3). A magnetic ring feature 153 may be added at each end of the coil assembly to help maintain magnetic flux alignment parallel to the axis of the core, and thereby reduce eddy losses within the coil ends.

FIG. 1*c* is a perspective view of a magnetic assembly using a U-U ferro-core, according to an embodiment of the present invention which shows fluid inlet portions of inlet duct(s) 112.

Figure 2:
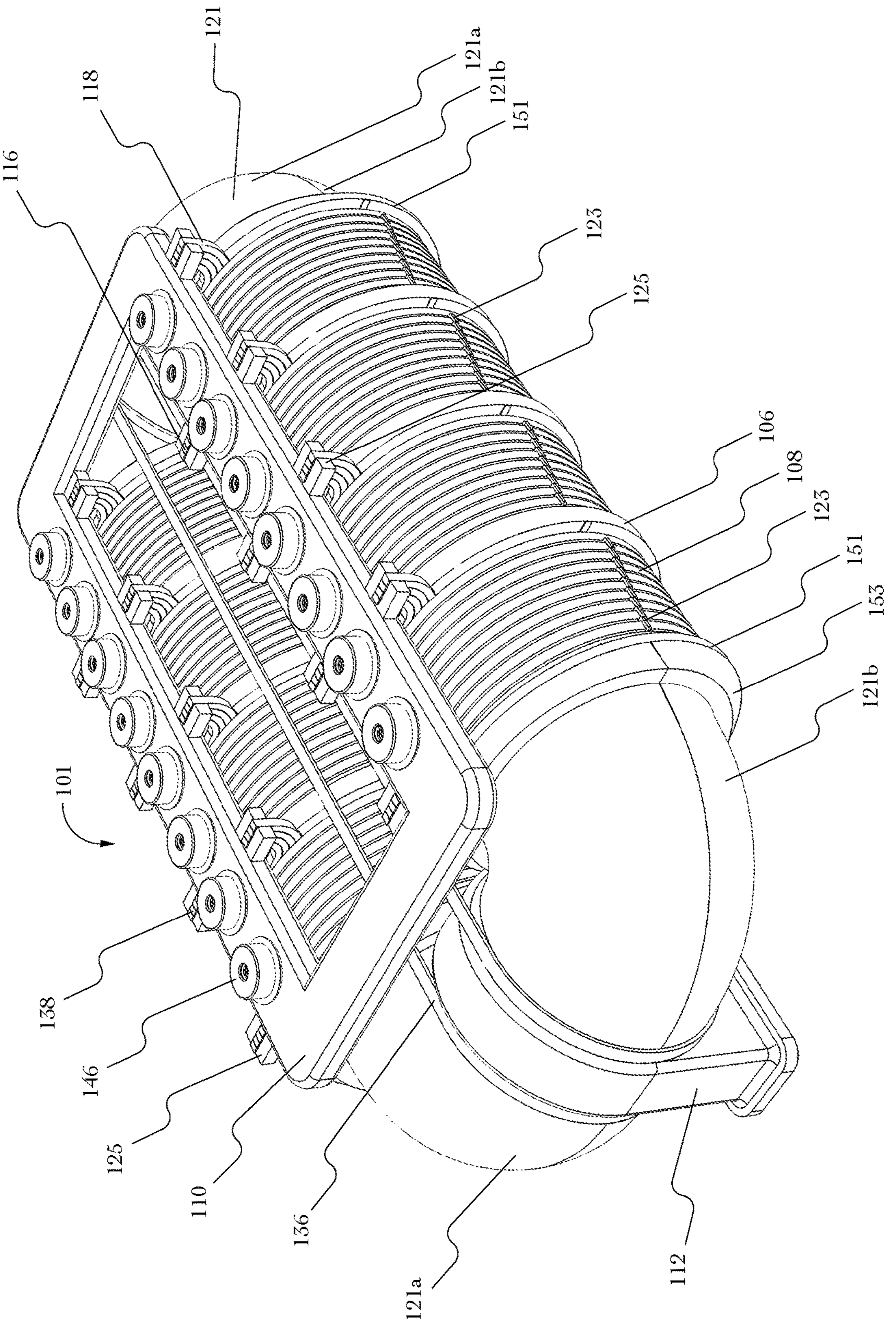
FIG. 2 is a perspective view of a magnetic assembly using a U-U ferro-core and a multilayer conductor, according to an embodiment of the present invention.

FIG. 2 is a perspective view of a magnetic assembly using a U-U ferro-core and a multilayer conductor, according to an embodiment of the present invention. FIG. 2 is identical to FIGS. 1*a, b*, and *c* except for the use of multilayer conductor 138. Advantages of using a multilayer conductor in place of a solid conductor may include reduced eddy losses and improved ease of bending. In order to maximize eddy loss reduction, a 180 degree transpose or twist may be added at the mid-point of the winding (not shown in FIG. 2).

Figure 3:
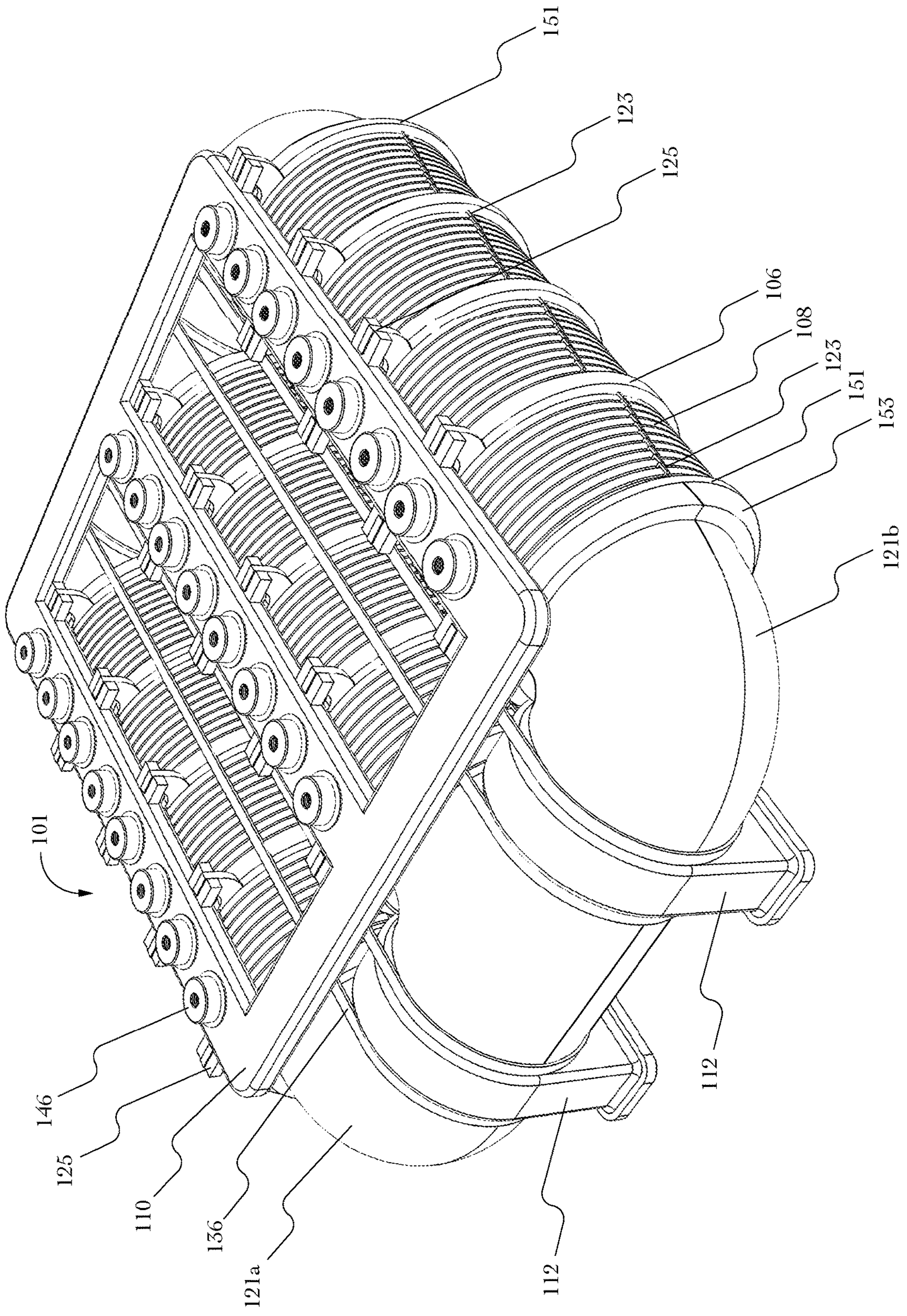
FIG. 3 is a perspective view of a three-phase magnetic assembly using a three-prong ferro-core, according to an embodiment of the present invention.

FIG. 3 is a perspective view of a three-phase magnetic assembly using a three-prong ferro-core, according to an embodiment of the present invention. The FIG. 3 magnetic assembly is similar to that of FIG. 1, except for the number of phases. The assembly may be a three-phase transformer or a three-phase inductor depending on the specifics of core 130. As shown, each of the three magnetic branches includes four coils 108, but different numbers may be used. As shown, each coil 108 is individually terminated via conductors within terminal assembly 110. Terminal assembly 110 allows coils 108 (windings) to be interconnected as desired to provide desired voltage and current levels.

Figure 4:
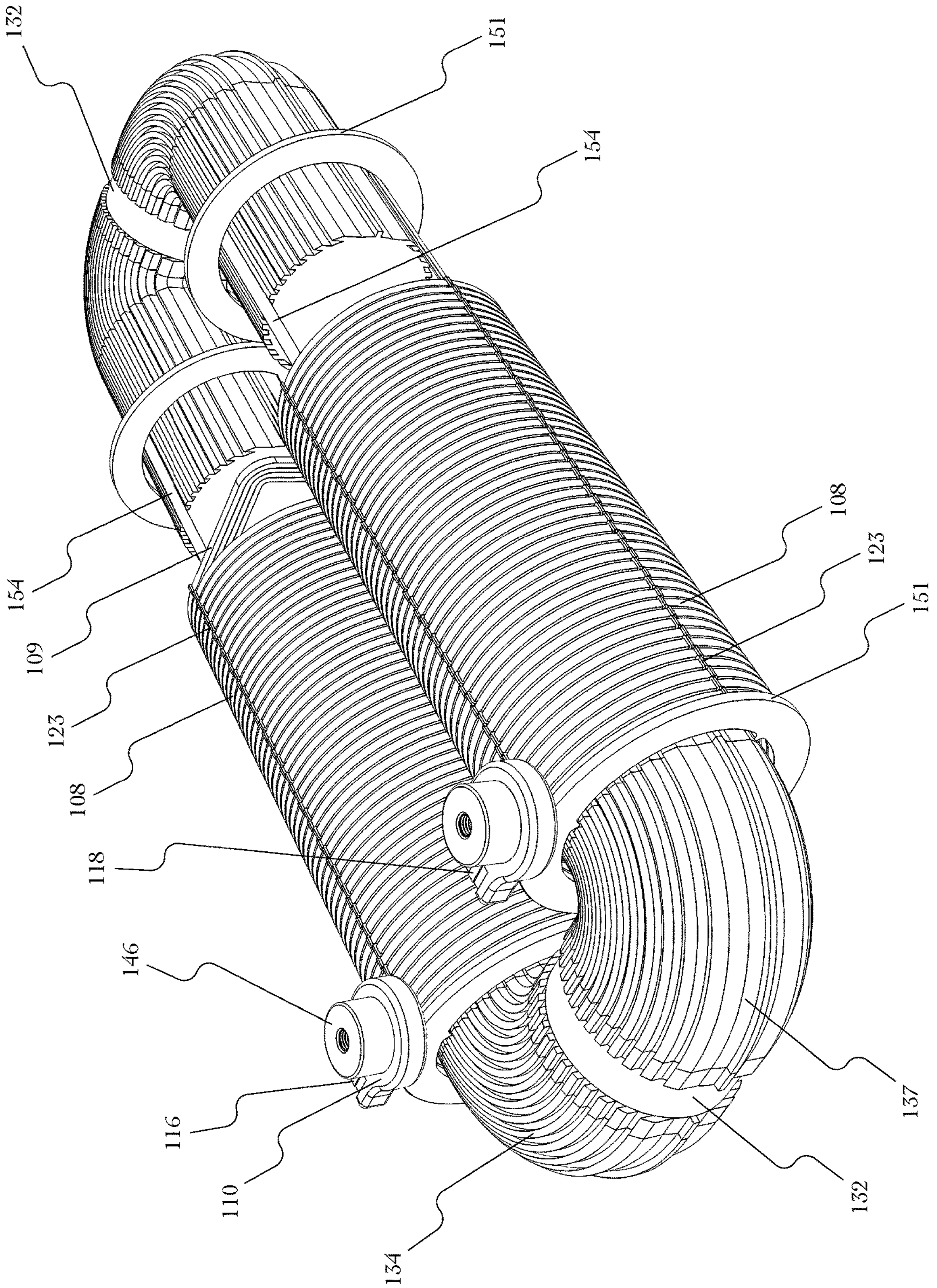
FIG. 4 is an exploded perspective view of an inductor using a U-U ferro-core, according to an embodiment of the present invention.
Figure 5:
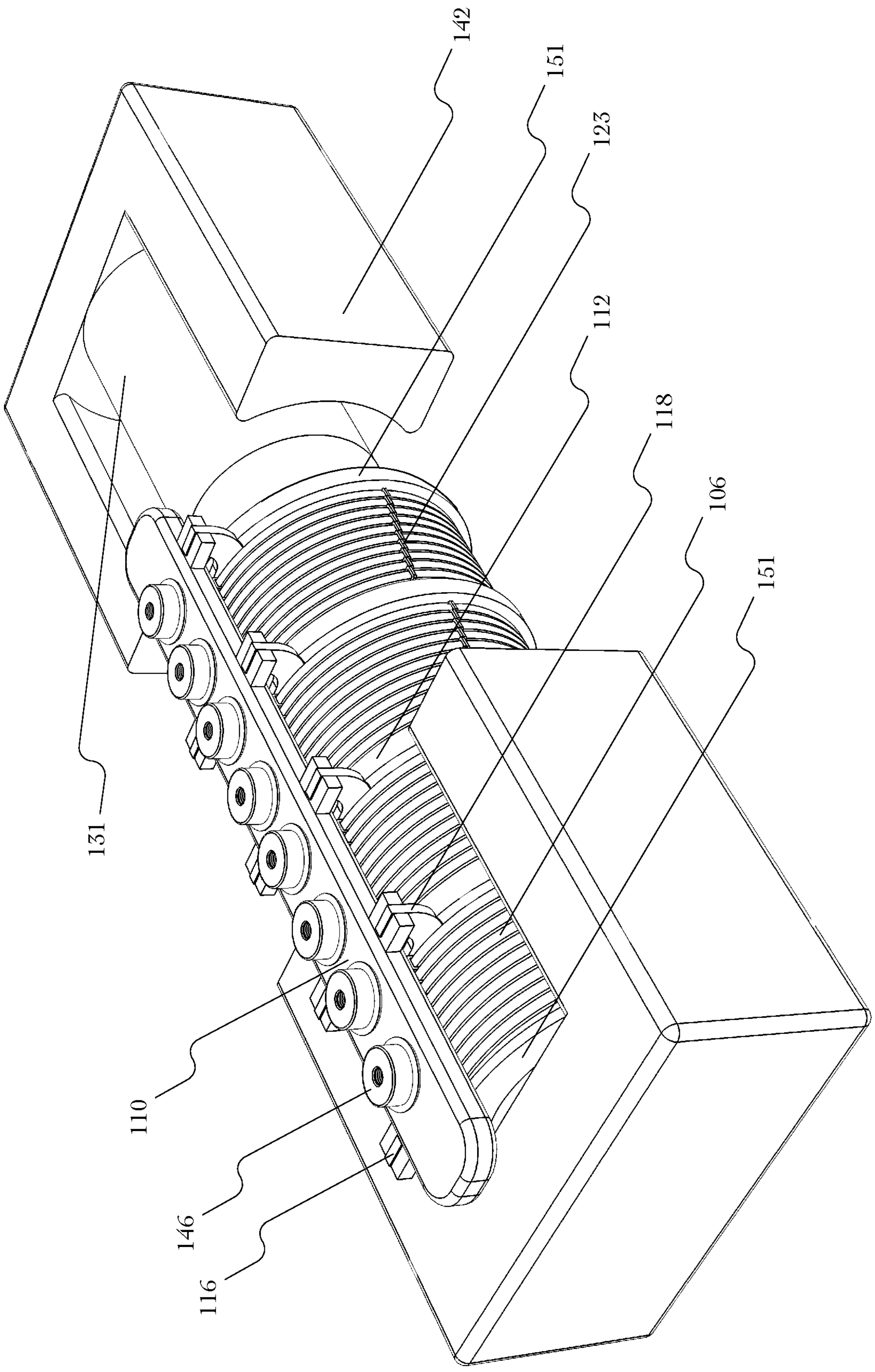
FIG. 5 is an exploded perspective view of a magnetic assembly using an E-E ferro-core, according to an embodiment of the present invention.

FIG. 4 is an exploded perspective view of an inductor using a U-U ferro-core 130 and a multilayer winding consisting of two series connected coils 108, according to an embodiment of the present invention. The coils connect via interconnect 109 which serves as a transposition (the outer layer of the first coil connects to the inner layer of the second coil, etc.). Electrical characteristics, including inductance and saturation current, are controlled, in part, by the core. As core permeability is reduced, inductance falls while saturation current and maximum energy storage increase.

Figure 7:
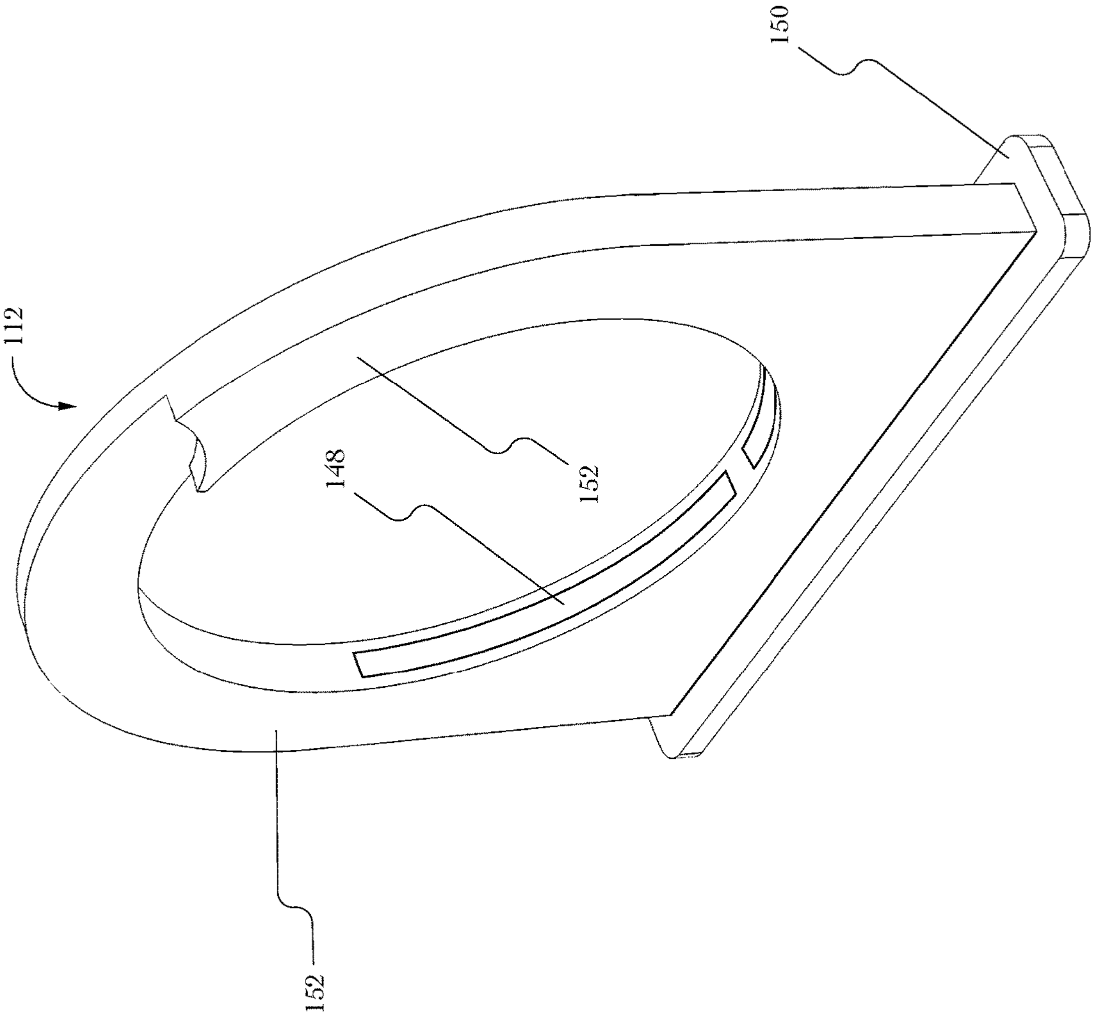
FIG. 7 is a perspective view of a feed element which may be used to inject coolant in the inner radial gap between the core and the coils of the magnetic assembly according to an embodiment of the present invention.
Figure 9A:
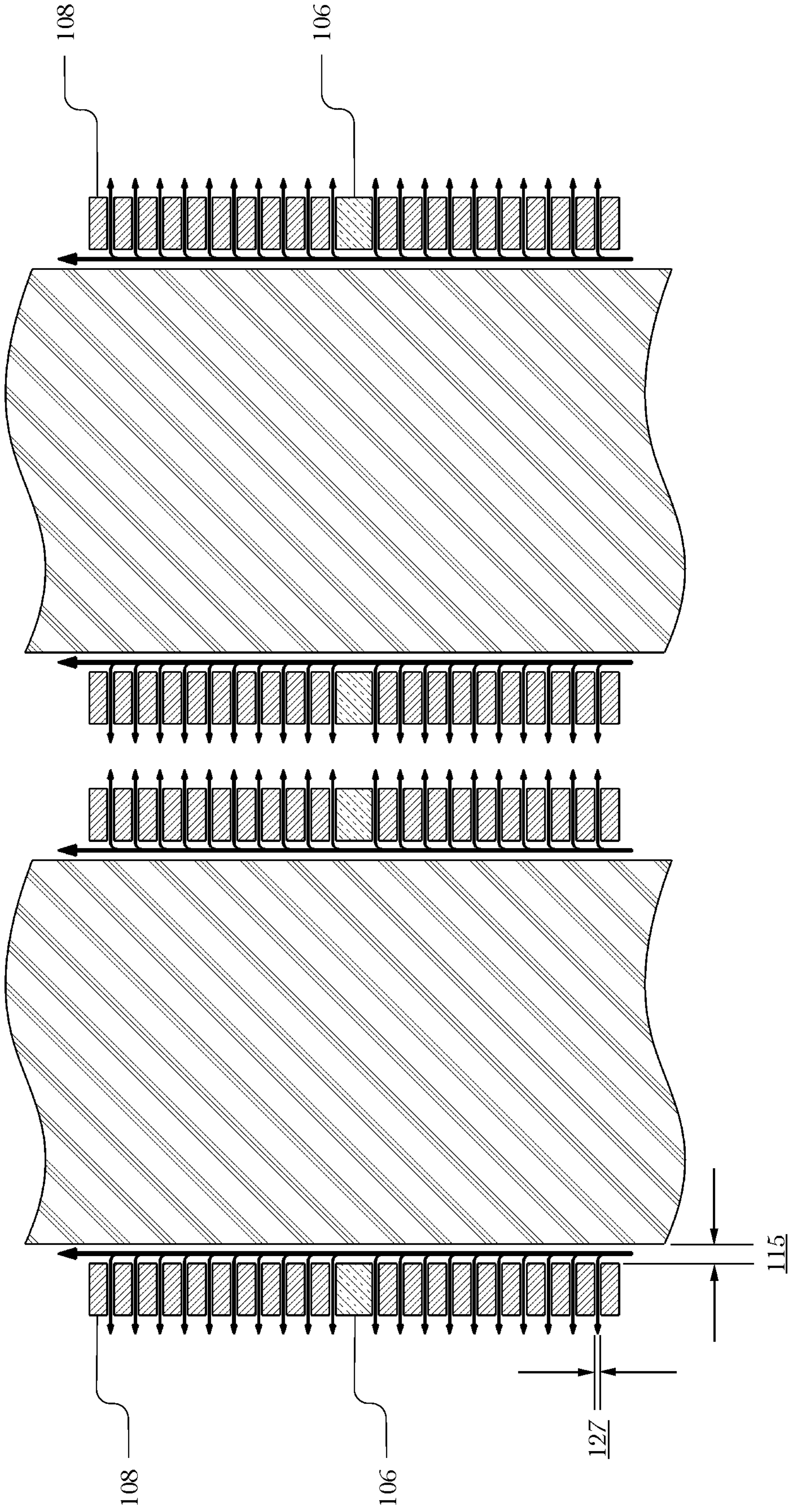
FIG. 9*a* is a flow diagram associated with a magnetic assembly using a U-U ferro-core according to an embodiment of the present invention.
Figure 9B:
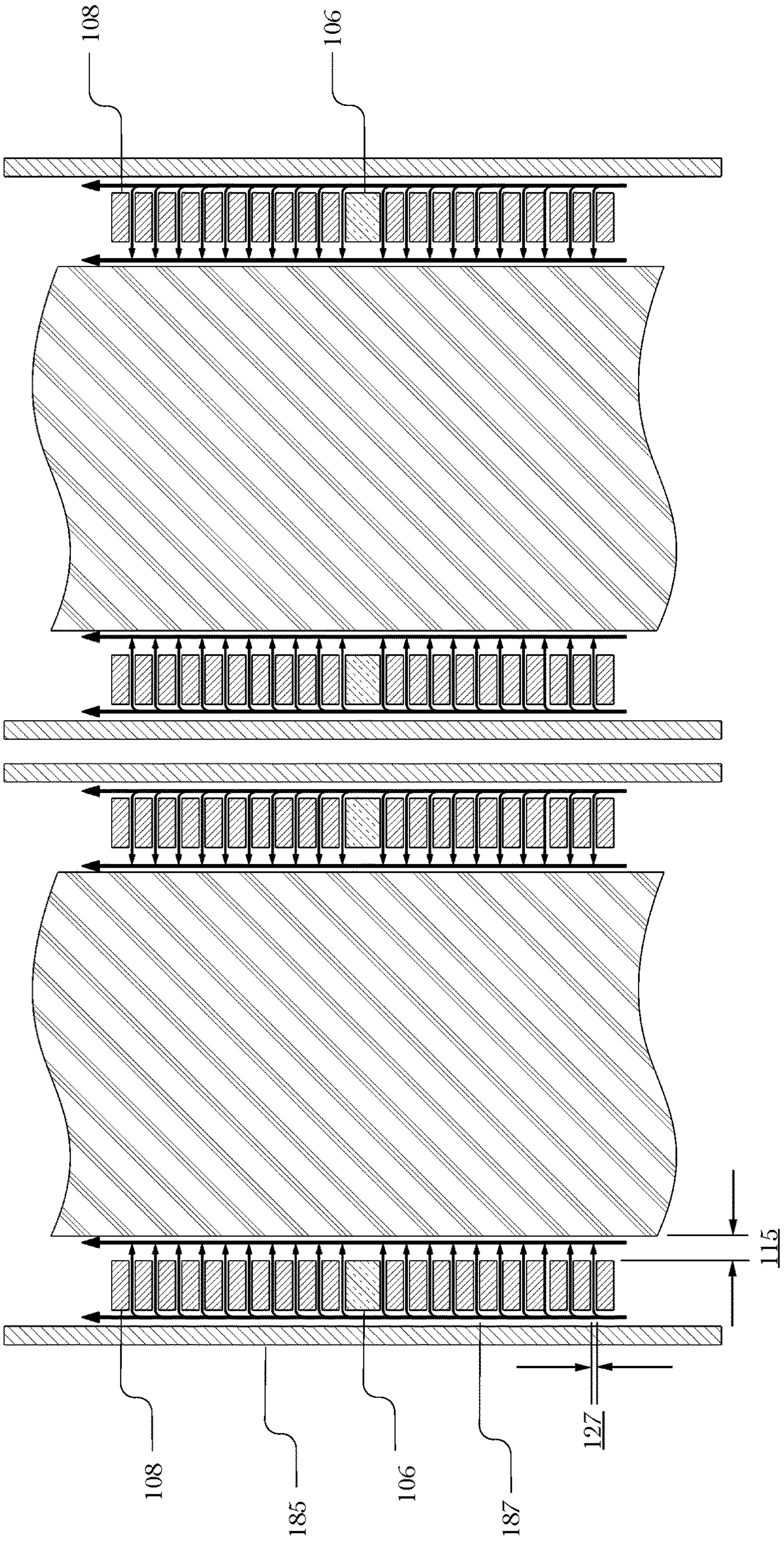
FIG. 9*b* is a flow diagram associated with a magnetic assembly using a U-U ferro-core according to an embodiment of the present invention.

FIG. 5 is an exploded perspective view of a magnetic assembly using E-E ferro-core, according to an embodiment of the present invention. Inlet duct 112 injects coolant into the inner radial gap between center prong 131 of core half 142 and coils 108. Details of inlet duct 112 are shown in FIG. 7. Used herein, an "inlet duct" may be any structure that is used to facilitate fluid injection into inner radial gap 115 (FIGS. 9*a* and 9*b*). Inlet duct 112 may be integrated with other elements which provide other functions as in the cases of FIGS. 1 through 3, wherein inlet duct 112 is integrated within shroud 121*a* and 121*b*, or as in the case of FIG. 5, wherein inlet duct 112 is integrated with a spacer. As with the embodiment of FIG. 1, coolant exits radially outward through axial gaps 127. The assembly, consisting of coils 108, spacers 106 and inlet duct 112 is held under compression by core halves 142; core halves may be bonded or clamped together to form a rigid structure. The assembly of FIG. 5 may be included within an enclosure similar to that of FIG. 10 such that coolant flow is recovered. The configuration of FIG. 5 may be applied to configurations using "E-E" cores. At each end of the coil stack fluid may be prevented from escaping from the volume inside the coils (and thereby caused to flow through the axial gaps 127) by a seal between the end of the coil stack (which may include the end shoulders 151) and the core half 142, or as a result of any gap between the end of the coil stack and the core half 142 being sufficiently small that little fluid is able to flow through it.

FIG. 6*a* is a perspective view of a single conductor coil used in the magnetic assembly according to an embodiment of the present invention. The coil is typically edge-wound using an insulated conductor of rectangular section. In some cases, the coil may be face-wound. Three or more rows of turn spacers 123 may be applied such that precise axial gaps 127 are established between adjacent turns. The size of these gaps is established by the diameter of the spacer—which may be of rectangular or round cross section. The turn spacers 123 may fabricated from a thread of appropriate thickness which is then interweaved between adjacent turns of coils. Multiple threads or spacers may be used in order to provide a plane between adjacent turns such that a uniform gap may be established between adjacent turns. Other types of spacers may be used such as a strip of material of the appropriate thickness to provide gaps between adjacent turns.

Figure 6B:
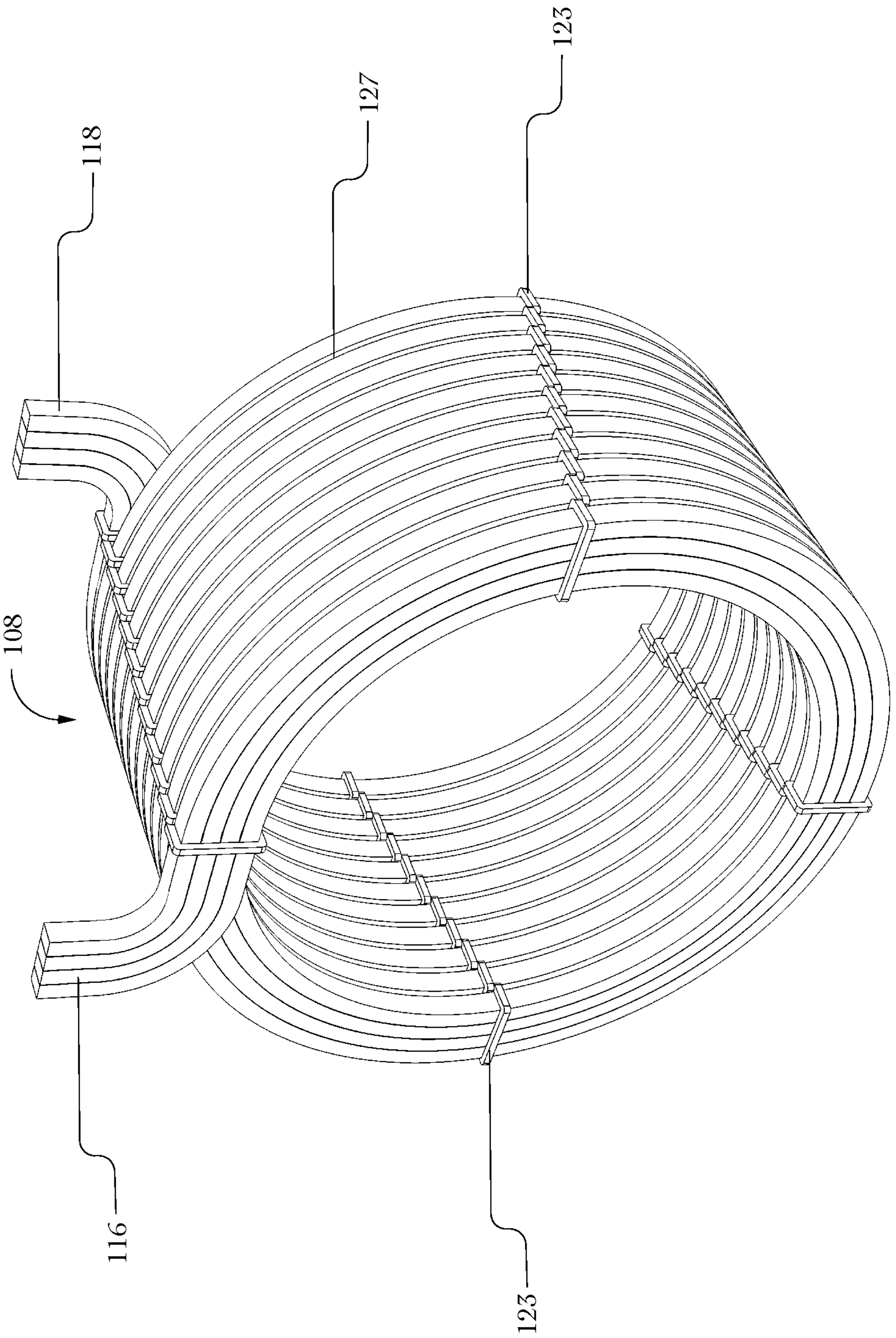
FIG. 6*b* is a perspective view of a multilayer coil used in the magnetic assembly according to an embodiment of the present invention.

FIG. 6*b* is a perspective view of a multilayer coil used in magnetic assembly 101 according to an embodiment of the present invention. FIG. 6*b* is similar to FIG. 6*a*, except that a multilayer conductor is used in place of a solid conductor. The multilayer conductor may provide bending advantages in some cases. It also may serve to reduce high frequency eddy losses. Eddy loss reduction may be maximized by adding a 180 degree transpose (not shown) at the midpoint of the coil.

FIG. 7 is a perspective view of inlet duct 112 which may be used to inject coolant in inner radial gap 115 between core 130 and coils 108 of the magnetic assembly according to an embodiment of the present invention. In the case of FIG. 7, inlet duct 112 also serves the function of a spacer. Feed slots 148 serve to direct coolant from an inlet point to inner radial gap 115. Flange 150 mates to an enclosure (not shown) and forms a seal or partial seal such that coolant is directed from the enclosure into feed slots 148. Spacer surface 152 aligns with the face of a coil such that an axial gap 127 is established for coolant flow.

FIG. 8 is a perspective view of spacer 106 which may be used to separate adjacent coils 108 of the magnetic assembly according to an embodiment of the present invention. Spacer surface 152 aligns parallel with the face of a coil 108 such that an axial gap 127 is established for coolant flow.

FIG. 9*a* is a flow diagram associated with magnetic assembly 101 using a U-U ferro-core according to an embodiment of the present invention. As shown, coolant flows through the inner radial gap 115; coolant exits the inner radial gap 115 by flowing radially outward through axial gaps 127 between adjacent turns. It may be seen that the inner radial gap 115 operates as a manifold feeding a plurality of axial gaps 127. This (radial) component of fluid flow may be responsible for the majority of head loss. Axial coolant flow through inner radial gap 115 also serves to provide cooling of core 130. The fluid flow is described, in the context of some of the embodiments disclosed herein, as being radially outward through the axial gaps 127, but in any of the embodiments described herein fluid may flow in the opposite direction with a similar effect. As such, any reference herein to "inlet" may be, in some embodiments, replaced with "outlet", and vice versa. For example, in FIG. 9*a*, fluid may flow in the opposite direction to that illustrated with substantially the same effect (except that the cooling of the core may be somewhat less effective, the fluid having been warmed by the coils when it reaches the core, and the cooling of the coils may be somewhat more effective, the coolant not having been warmed by the core, when it flows through the axial gaps 127). FIG. 9*b* shows such a flow pattern (with fluid flowing radially inward, instead of radially outward, through the axial gaps 127). FIG. 9*b* also shows a shroud 185 around the outside of the coils, forming an outer radial gap 187 through which the fluid flows to the axial gaps 127. In the embodiment of FIG. 9*b*, the shroud 185 functions as part of a manifold structure feeding a plurality of axial gaps 127.

In some embodiments, the inner radial gap 115 may be absent (the coil may fit snugly on the core) and an outer shroud may fit snugly on the outside of the coil. The outer shroud may have two channels (e.g., approximately diametrically opposed channels) feeding fluid to one side of the core and collecting it from the other side, to which it flows through the axial gaps 127. In such an embodiment the flow within the axial gaps 127 is substantially parallel to the conductors.

Figure 10:
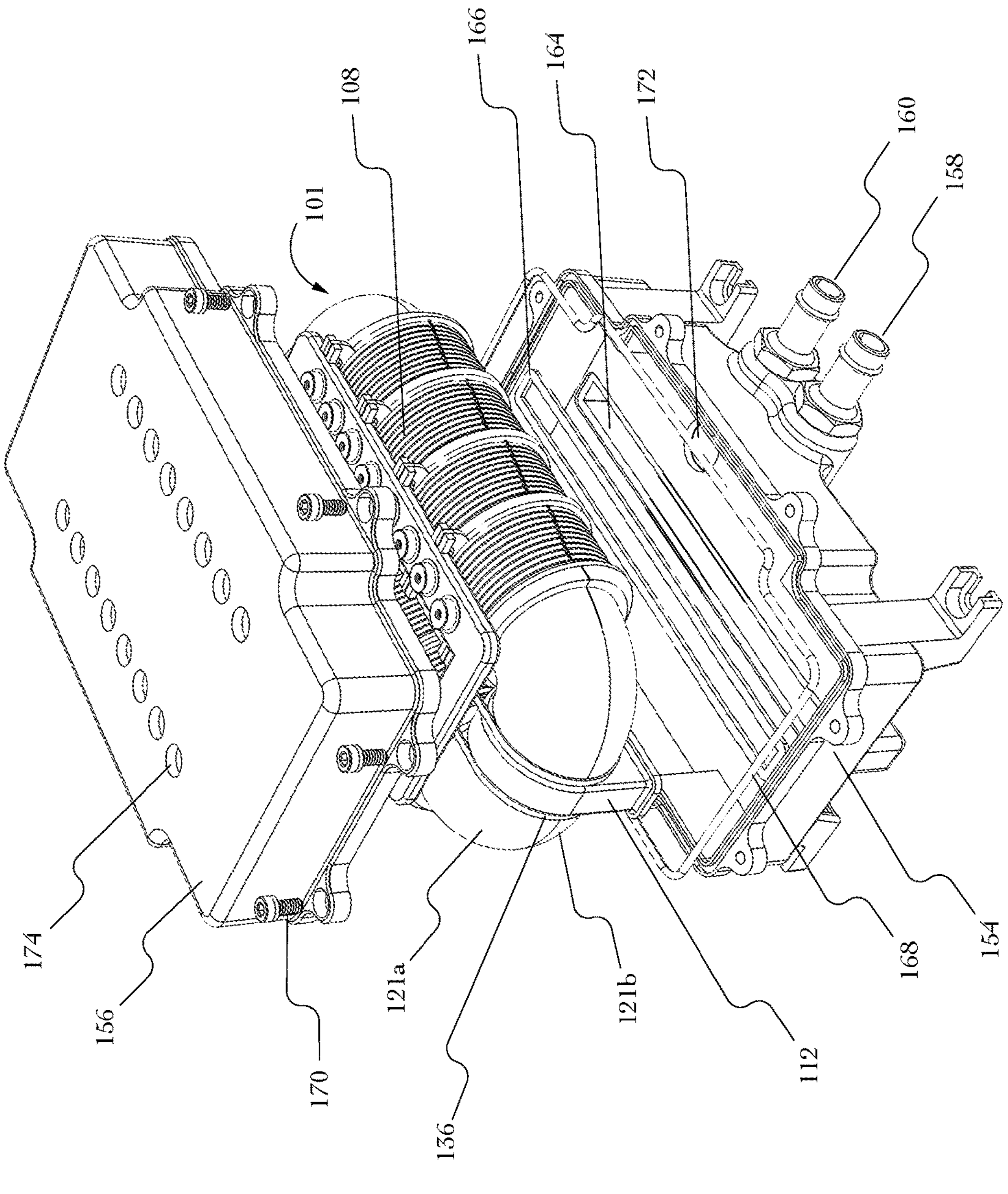
FIG. 10 is an exploded perspective view of a complete magnetic assembly including the enclosure according to an embodiment of the present invention.

FIG. 10 is an exploded perspective view of a complete magnetic assembly including the enclosure according to an embodiment of the present invention. The enclosure is a two-piece structure consisting of enclosure bottom 154 and enclosure top 156. The two enclosure elements mate together forming a seal (e.g., a liquid tight seal) provided by enclosure O-ring 168 and assembly screws 170. Coolant introduced via inlet 158 is distributed by coolant slot 164 to inlet ducts 112. Coolant which exits axial gaps 127 is contained by the enclosure cavity and is recovered by flow port 172 which is contiguous with outlet 160. Gasket 166 may be included to help seal the interface between inlet ducts 112 and coolant slot 164. Enclosure bottom 154 may include mounting feet 162. Enclosure top 156 may include terminal holes 174 which allow terminal posts 146 to protrude as needed. Terminal O-rings 178 may be placed over terminal posts 146 to insure coolant sealing at the enclosure-terminal post interface.

Figure 11A:
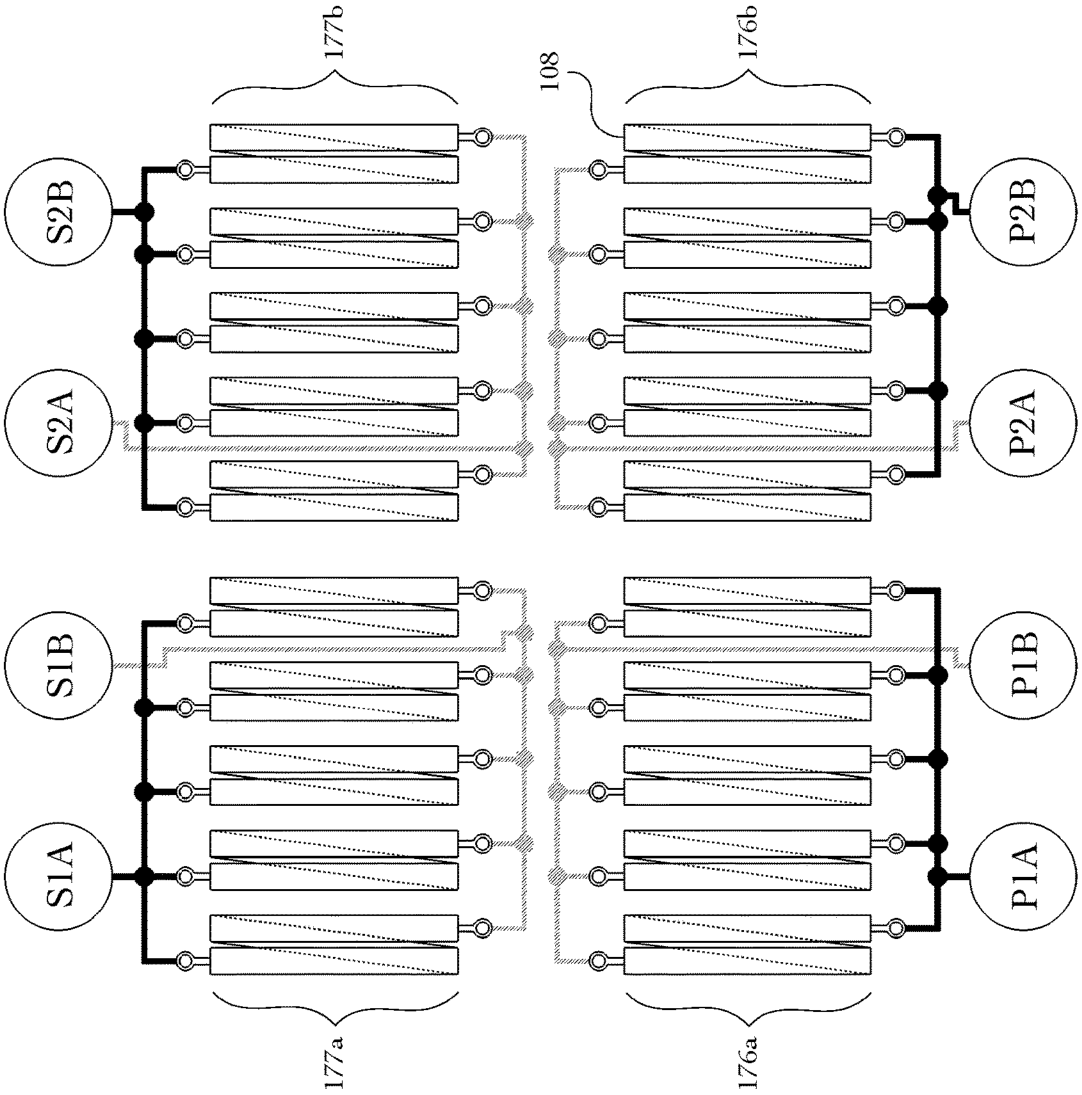
FIG. 11*a* is a coil interconnect diagram for a transformer where primary and secondary coils are non-interleaved such that leakage inductance is maximized.

FIG. 11*a* is a coil interconnect diagram for a transformer where primary and secondary coils 108 are non-interleaved such that leakage inductance is maximized. Primary coils are interconnected to form primary coil groups 176*a* and 176*b* and secondary coils are interconnected to form secondary coil groups 177*a* and 177*b*. It should be noted that while five coils are shown in each coil group, a coil group may consist of any number of coils. Likewise, there is no restriction on the number of primary groups and secondary groups.

Figure 11B:
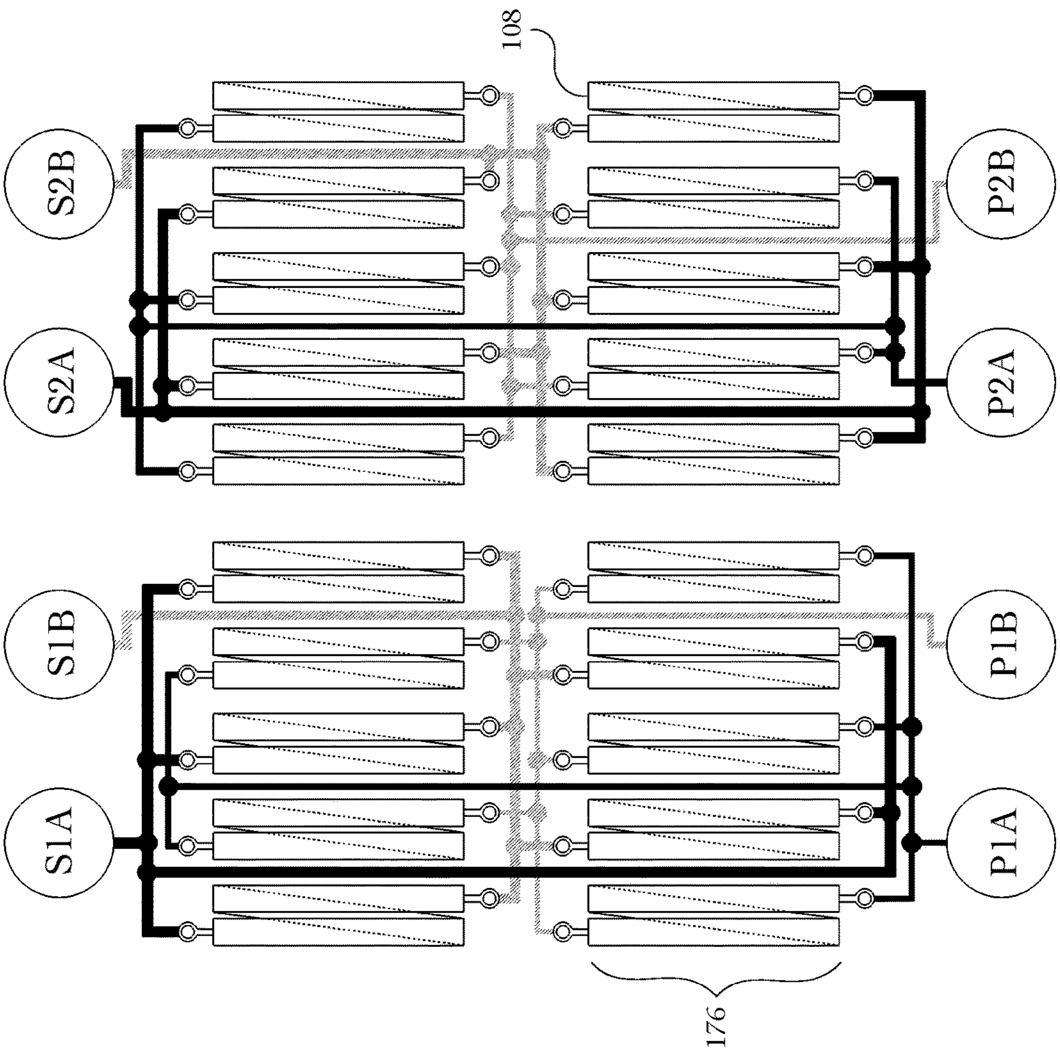
FIG. 11*b* is a coil interconnect diagram for a transformer where primary and secondary coils are maximally interleaved such that leakage inductance is minimized.

FIG. 11*b* is a coil interconnect diagram for a transformer where primary and secondary coils 108 are maximally interleaved such that leakage inductance is minimized. Due to the constraints of interleaving, it follows that for each coil group 176, the number of primary coils 108 will equal the number of secondary coils 108 plus one or minus one.

Figure 12:
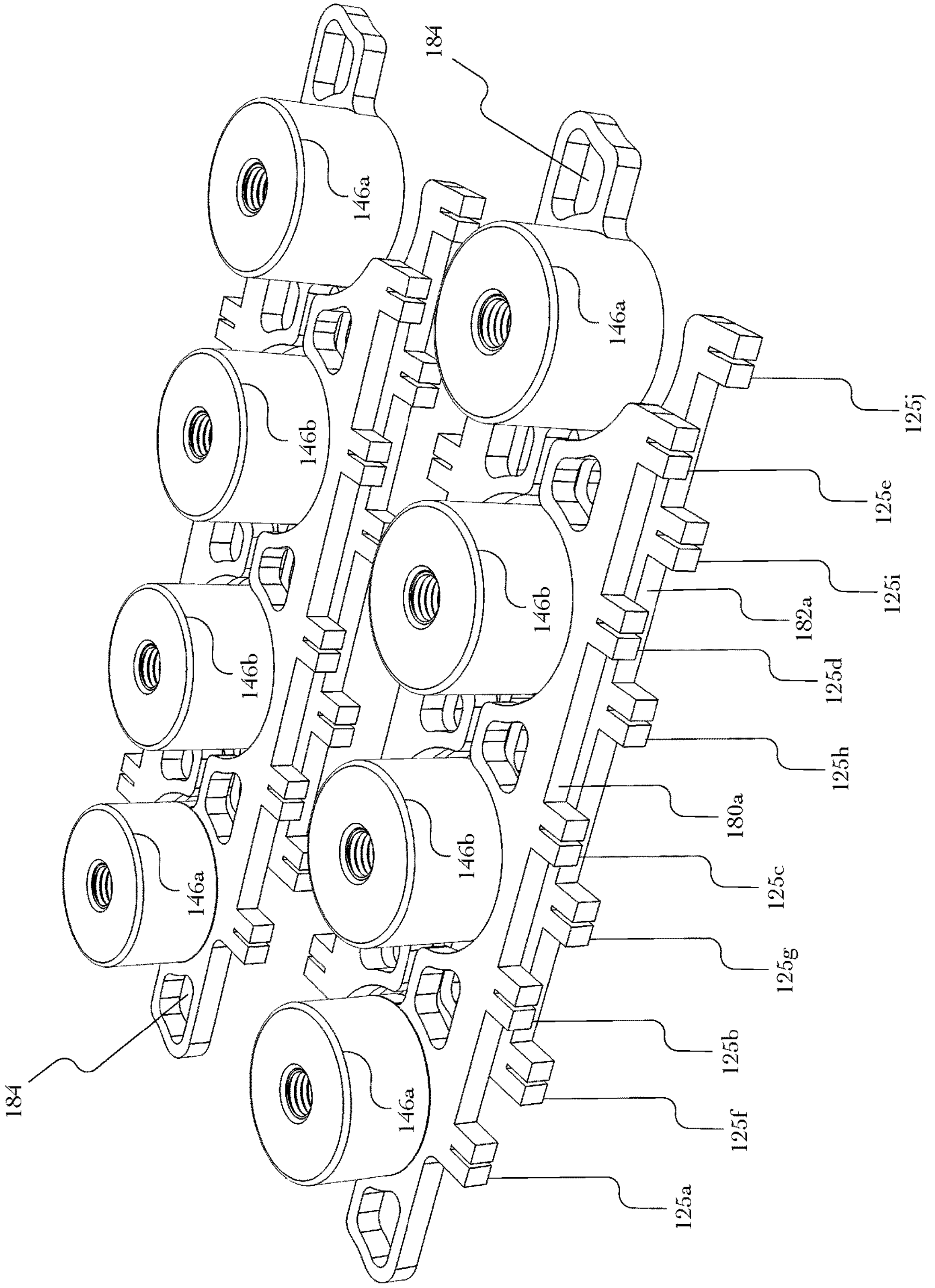
FIG. 12 is a perspective view of the terminal assembly according to an embodiment of the present invention.

FIG. 12 is a perspective view of terminal assembly 110 according to an embodiment of the present invention. The case shown is where a total of twenty coils are interconnected to form four separate windings or winding groups and where two conductor layers are used. (These numbers are only for example and alternative designs are possible having different numbers of coils, windings, conductors, and conductor layers.) Terminal assembly 110 comprises four upper conductors (180*a* through 180*d*) and four lower conductors (182*a* through 182*d*). In turn, each upper conductor is a solid metal element comprising terminal tigs 125*a* through 125*e* and one terminal post 146*a*; the twenty winding starts connect to terminal tigs 125*a* through 125*e* for each of the four upper conductors. Likewise, each lower conductor is a solid metal element comprising terminal tigs 125*f* through 125*j* and one terminal post 146*b*; the twenty winding finishes connect to terminal tigs 125*f* through 125*j* for each of the four bottom conductors. Slots 184 are included within the conductors to aid in mechanical reinforcement of the assembly when over-molded to form the final assembly. Both terminal tigs 125 and terminal posts 146 protrude through the over-mold as shown in FIGS. 1*a* and 1*b*.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a fluid cooled magnetic element have been specifically described and illustrated herein, many modifications and variations will be apparent to those skilled in the art. Accordingly, it is to be understood that a fluid cooled magnetic element constructed according to principles of this disclosure may be embodied other than as specifically described herein. The invention is also defined in the following claims, and equivalents thereof.

What is claimed is:

1. A fluid-cooled magnetic element, comprising:
a first electrically conductive coil;
a first turn spacer, extending between two adjacent turns of the first electrically conductive coil;
a fluid inlet; and
a fluid outlet,
wherein:
the first turn spacer is configured to establish a first gap between the two adjacent turns, and
a fluid path extends from the fluid inlet to the fluid outlet through the first gap,
further comprising:
a plurality of electrically conductive coils including the first electrically conductive coil; and
a plurality of axial gaps, between adjacent pairs of turns of the plurality of electrically conductive coils, the plurality of axial gaps including the first gap,
wherein the fluid-cooled magnetic element is configured to impede fluid from escaping except through the axial gaps.

2. The fluid-cooled magnetic element of claim 1, wherein the first turn spacer is a thread or a strip.

3. The fluid-cooled magnetic element of claim 1, further comprising:
a second electrically conductive coil; and
a second insulating spacer,
wherein:
the first electrically conductive coil is a hollow cylindrical coil,
the second electrically conductive coil is a hollow cylindrical coil, and
the second insulating spacer is between the first electrically conductive coil and the second electrically conductive coil.

4. A fluid-cooled magnetic element, comprising:
a first electrically conductive coil;
a first turn spacer, extending between two adjacent turns of the first electrically conductive coil;
a fluid inlet; and
a fluid outlet,
wherein:
the first turn spacer is configured to establish a first gap between the two adjacent turns, and
a fluid path extends from the fluid inlet to the fluid outlet through the first gap,
further comprising:
a second electrically conductive coil; and
a second insulating spacer,
wherein:
the first electrically conductive coil is a hollow cylindrical coil, the second electrically conductive coil is a hollow cylindrical coil, and the second insulating spacer is between the first electrically conductive coil and the second electrically conductive coil, wherein the first electrically conductive coil has a first end and a second end, and the second electrically conductive coil has a first end and a second end connected to the first end of the first electrically conductive coil, and wherein a contribution to a magnetic field at the center of the first electrically conductive coil, from a current flowing through both coils in series, is in the same direction as a contribution to the magnetic field from the current flowing through the second electrically conductive coil.

5. The fluid-cooled magnetic element of claim 1, wherein the first electrically conductive coil is edge wound.

6. The fluid-cooled magnetic element of claim 1, wherein the first electrically conductive coil is face wound.

7. The fluid-cooled magnetic element of claim 6, comprising a core comprising a core portion, the core having a channel, wherein a fluid path extends from the fluid inlet to the fluid outlet through the channel.

8. The fluid-cooled magnetic element of claim 1, wherein the fluid path includes a substantially radial segment within the first gap.

9. The fluid-cooled magnetic element of claim 8, further comprising a core inside the first electrically conductive coil, wherein the first electrically conductive coil fits snugly on the core.

10. A fluid-cooled magnetic element of claim 1, comprising:

a first electrically conductive coil;

a first turn spacer, extending between two adjacent turns of the first electrically conductive coil;

a fluid inlet; and a fluid outlet, wherein:

the first turn spacer is configured to establish a first gap between the two adjacent turns, and a fluid path extends from the fluid inlet to the fluid outlet through the first gap, further comprising a second electrically conductive coil, wherein each of the first electrically conductive coil and the second electrically conductive coil is a multilayer coil including a plurality of co-wound conductors in layers, and wherein an inner layer of the first electrically conductive coil is connected to an outer layer of the second electrically conductive coil.

11. The fluid-cooled magnetic element of claim 10, wherein the first electrically conductive coil and the second electrically conductive coil include a single continuous conductor including the inner layer of the first electrically conductive coil and the outer layer of the second electrically conductive coil.

12. The fluid-cooled magnetic element of claim 1, wherein the fluid inlet is:

a channel opening into a shroud or a channel through a spacer between the first electrically conductive coil and a second electrically conductive coil adjacent to the first electrically conductive coil.

13. The fluid-cooled magnetic element of claim 1, further comprising a housing containing the first electrically conductive coil and the first turn spacer, the fluid inlet and the fluid outlet being in the housing.

14. The fluid-cooled magnetic element of claim 1, further comprising:

a second electrically conductive coil;

a first terminal;

a second terminal;

a third terminal; and a fourth terminal, wherein:

the first terminal is connected to a first end of the first electrically conductive coil, the second terminal is connected to a second end of the first electrically conductive coil, the third terminal is connected to a first end of the second electrically conductive coil, and the fourth terminal is connected to a second end of the first electrically conductive coil.

15. The fluid-cooled magnetic element of claim 1, wherein the first gap has a width greater than 0.001 inches and less than 0.071 inches.

16. The fluid-cooled magnetic element of claim 1, wherein the first electrically conductive coil and the first turn spacer are held in compression.

17. The fluid-cooled magnetic element of claim 1, further comprising a terminal assembly comprising a plurality of conductive layers including a first conductive layer.

* * * * *